UNITED STATES PATENT OFFICE.

JOSHUA G. CASHIN, OF GARDNER, MASSACHUSETTS.

IMPROVEMENT IN COMPOSITIONS FOR COLORING WOOD.

Specification forming part of Letters Patent No. 185,669, dated December 26, 1876; application filed October 2, 1876.

*To all whom it may concern:*

Be it known that I, JOSHUA G. CASHIN, of Gardner, of the county of Worcester and State of Massachusetts, have made a new and useful invention having reference to compositions for coloring wood; and do hereby declare the same to be described as follows:

My invention is designed more especially for coloring, or coloring and graining, articles of wood.

In carrying it out, I first make what I term the "ground coloring composition," which is composed not only of a solution of Brazil-wood or redwood, or other wood producing a red color, but of alum and starch, or flour. In making the composition, take fifty pounds of the redwood reduced to small chips or pieces, and put it into bags, and such into a kettle with a sufficient amount of water, say about one hundred gallons. To this add twenty pounds of alum and twenty pounds of the starch or flour. The whole is to be boiled for about three hours. The liquid composition, after separation from the bags and their contents, will be ready for use. Into it the article to be colored is to be dipped, or the coloring liquid may be spread by means of a brush upon the article.

The next or graining composition is composed of iron, (as iron filings, for instance,) acetic acid, and chloride of sodium, in the proportions of, say, ten pounds of the iron, three gallons of the acetic acid, and one pound of the chloride of sodium. This should be put together in a vessel, and allowed to stand about two days or more, the solution being occasionally well stirred in the meantime. The graining composition is to be applied to the surface colored by the coloring composition, and this may be done by an ordinary graining brush or tool. A change in color of the graining composition follows from its contact with the coloring composition—that is to say, it is changed from a yellow or light brown to a black or very dark brown. The whole produces effects in coloring and graining not attainable by the ordinary compositions heretofore in use for such purposes.

I do not confine either of the said compositions to the precise proportions of the ingredients as stated, as these may be somewhat varied and still be productive of good results.

After the article may have been treated, as described, by the two compositions, (which chemically act on each other,) and been varnished, it will have a true or very perfect rosewood color, which will be brought out or improved by the varnish.

I claim as my invention as follows:

1. The described coloring or ground composition, consisting of a solution of Brazil-wood or redwood, alum, and starch or flour, in or about in the proportions, and combined, as set forth.

2. The described graining composition, consisting of iron, acetic acid, and chloride of sodium, in or about in the proportions, and combined, as set forth.

3. The combination, in manner as described, of a ground color, consisting of a solution of redwood, alum, and starch or flour, as set forth, with a graining color composed of iron, acetic acid, and chloride of sodium, as described, to produce upon an article to which such may be so applied the colors and appearance of rosewood, substantially as specified.

JOSHUA G. CASHIN.

Witnesses:
R. H. EDDY,
J. R. SNOW.